(No Model.)
G. LAUBE.
VEHICLE WHEEL.
No. 543,310. Patented July 23, 1895.
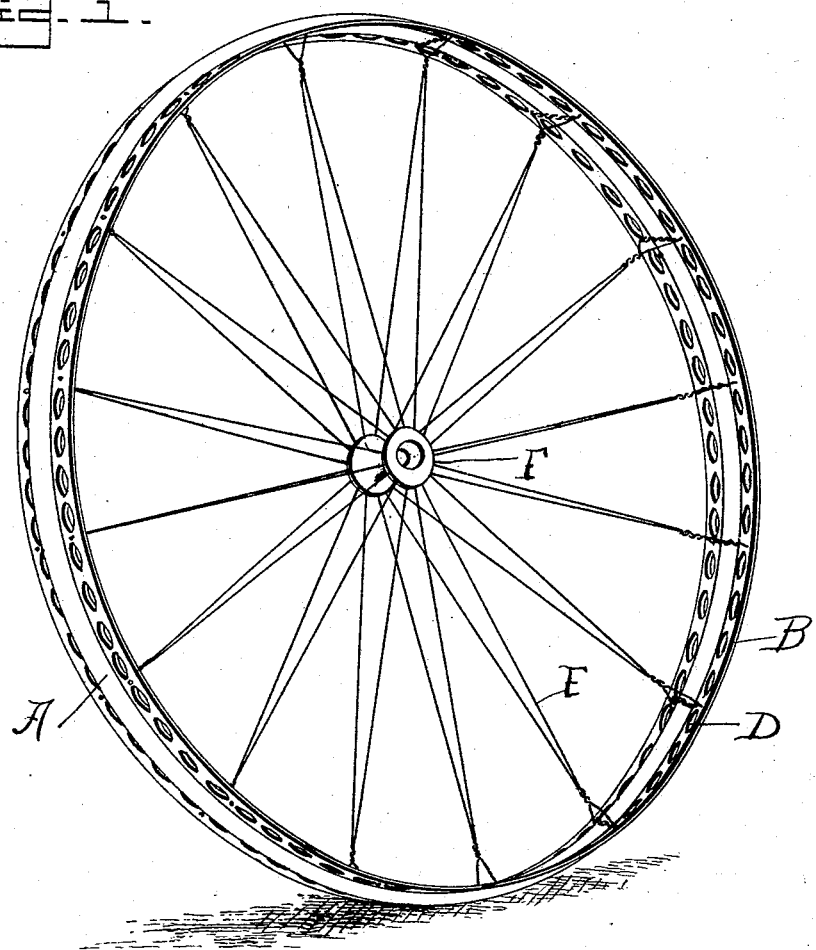
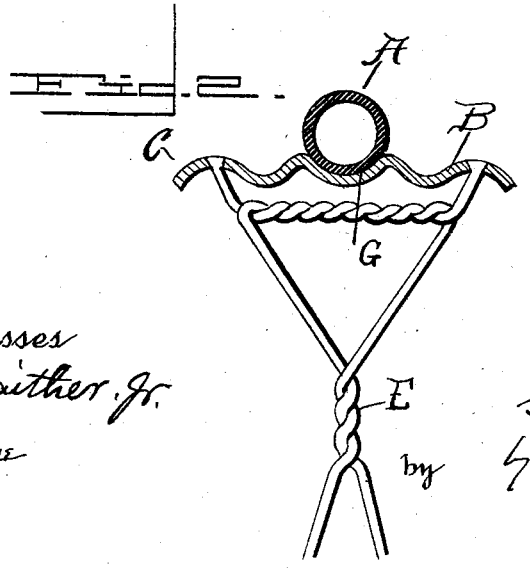
Witnesses
J. C. Gaither, Jr.
C. L. Reese
Inventor,
Godfried Laube
by Evarts Appleman
Attorneys

UNITED STATES PATENT OFFICE.

GODFRIED LAUBE, OF HURON, SOUTH DAKOTA, ASSIGNOR OF ONE-HALF TO JOSEPH HYMANS, OF DEL RIO, TEXAS.

VEHICLE-WHEEL.

SPECIFICATION forming part of Letters Patent No. 543,310, dated July 23, 1895.

Application filed March 24, 1894. Serial No. 504,911. (No model.)

*To all whom it may concern:*

Be it known that I, GODFRIED LAUBE, a citizen of the United States of America, residing at Huron, in the county of Beadle and State of South Dakota, have invented certain new and useful Improvements in Vehicle-Wheels, of which the following is a specification, reference being had to the accompanying drawings.

This invention relates to certain new and useful improvements in vehicle-wheels, and more particularly to that class employing a flexible tire.

The object of the invention is to provide a novel and inexpensive safety-guard for wheels of the above-referred-to class, whereby the wheel will be prevented from entering crevices and cracks, thus taking up and preventing the jar caused by reason of such irregularities in the path of travel. Furthermore, to construct a novel form of wheel that will have advantages in point of simplicity, durability, and an attachment that will be attractive.

The invention has for its still further object to construct a safety-guard for wheels of this class that will contain the combined features of guard and felly.

The invention finally consists in the novel construction, combination, and arrangement of parts to be hereinafter more particularly described, and specifically pointed out in the claim.

In describing the invention in detail reference is had to the accompanying drawings, forming a part of this specification, wherein like letters of reference indicate similar parts throughout the several views, in which—

Figure 1 is a view in perspective showing my invention applied to the wheel. Fig. 2 is a detail view of a section of the felly with the guard applied.

In the drawings, A represents the flexible tire; B, the combined guard and felly having outwardly-extending curved flanges C, said flanges being provided with perforations D.

E represents the spokes of the ordinary construction, being rigidly attached to the combined felly and guard and terminating in the hub F.

G represents an annular groove formed centrally in the combined felly and guard, said groove forming a seat and bearing for the flexible tire.

The attachment may be made of any suitable metal, but preferably such as are capable of a high polish. The tire proper may be made of rubber, leather, woven cord, or what is known as the "pneumatic" tire.

It will be noted that the above-described attachment may be used with great advantage on bicycles, tandems, tricycles, baby-carriages, and light roadsters.

The perforations are formed on the flanges for the purpose of giving lightness to the wheel, yet I do not wish to limit myself to this specific construction, as the same can be dispensed with and the same made solid, if desired.

Attention is called to the fact that the outwardly-extending flanges do not come in direct contact with the ground unless the tire strikes a rut or crevice. The wheel will then receive its bearing from the outwardly-extending flanges.

As heretofore mentioned, spokes of the ordinary construction may be employed in connection with the improved attachment. It has been found, however, to be of an additional advantage to employ my double-twist spoke, which forms the subject-matter of a separate application for Letters Patent.

It will be noted that various changes may be made in the detail construction of this device without departing from the general idea involved.

Having fully described my invention, what I claim as new, and desire to secure by Letters Patent, is—

In a vehicle wheel, the combination with the felly, having a central groove and formed with outwardly extending flanges, the outer edges of said flanges being curved to form a tread should the tire enter a rut, and a tire on said felly as and for the purpose specified.

In testimony whereof I affix my signature in presence of two witnesses.

GODFRIED LAUBE.

Witnesses:
ANNIE T. LAUBE,
HATTIE ROSE LAUBE.